United States Patent
Thornton

(10) Patent No.: US 9,750,235 B1
(45) Date of Patent: Sep. 5, 2017

(54) FISHING LURE RETRIEVAL APPARATUS

(71) Applicant: James Thornton, Marthasville, MO (US)

(72) Inventor: James Thornton, Marthasville, MO (US)

( * ) Notice: Subject to any disclaimer, the term of this patent is extended or adjusted under 35 U.S.C. 154(b) by 0 days.

(21) Appl. No.: 15/423,330

(22) Filed: Feb. 2, 2017

(51) Int. Cl.
*A01K 97/00* (2006.01)
*A01K 99/00* (2006.01)
*B25J 1/04* (2006.01)

(52) U.S. Cl.
CPC .............. *A01K 97/00* (2013.01); *A01K 99/00* (2013.01); *B25J 1/04* (2013.01)

(58) Field of Classification Search
CPC ............ A01K 97/00; A01K 99/00; B25J 1/04
USPC ........... 294/26, 175, 210, 211; 43/5, 6, 17.2; D22/134
See application file for complete search history.

(56) References Cited

U.S. PATENT DOCUMENTS

| | | | | |
|---|---|---|---|---|
| 432,523 A * | 7/1890 | Forsyth | ..................... | D06F 5/00 294/175 |
| 650,589 A * | 5/1900 | Randle | ..................... | B25J 1/04 294/24 |
| 673,830 A * | 5/1901 | Wade | ..................... | B65G 7/12 294/26 |
| 1,345,027 A * | 6/1920 | Rippe | ................ | E04F 10/0648 294/175 |
| 4,086,718 A * | 5/1978 | Swanson | ................ | A01K 97/24 43/17.2 |
| 4,351,126 A * | 9/1982 | Simonson | ............. | A01K 97/14 294/26 |
| 4,385,849 A * | 5/1983 | Crain | ..................... | F16B 7/105 343/901 |
| 4,395,840 A | 8/1983 | Banks, Jr. | | |
| 4,574,512 A * | 3/1986 | Hahn | ..................... | A01K 97/14 294/19.3 |
| D330,492 S * | 10/1992 | Brown | ........................ | 294/26 |
| 5,228,226 A * | 7/1993 | Porosky | ................ | A01K 97/14 294/26 |
| D372,294 S * | 7/1996 | Grimaldi, II | ................ | D22/134 |
| 6,305,119 B1 | 10/2001 | Kacak | | |
| 6,694,664 B1 | 2/2004 | Knight | | |

\* cited by examiner

*Primary Examiner* — Paul T Chin
(74) *Attorney, Agent, or Firm* — Stevenson IP, LLC

(57) ABSTRACT

A fishing lure retrieval apparatus including a telescopic cylindrical pole and a looped strap attached to the cylindrical pole. A cylindrical hook attachment member is attached to and extended outwards from a front end of a front portion of the cylindrical pole. An S-shaped hook member is attached to a front surface of the cylindrical hook attachment member. The S-shaped hook member is perpendicularly disposed to and extended upwards above the cylindrical hook attachment member. The S-shaped hook member is selectively engageable around a fishing lure.

1 Claim, 4 Drawing Sheets

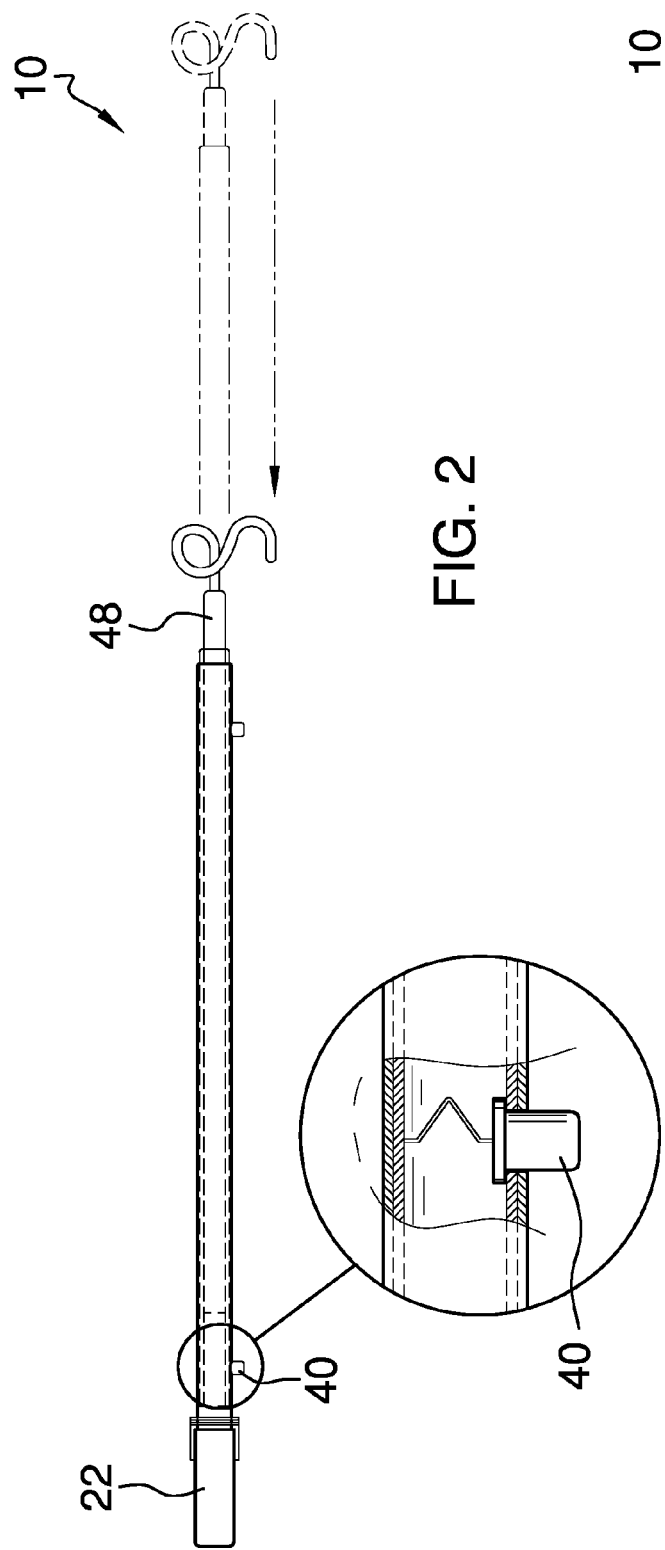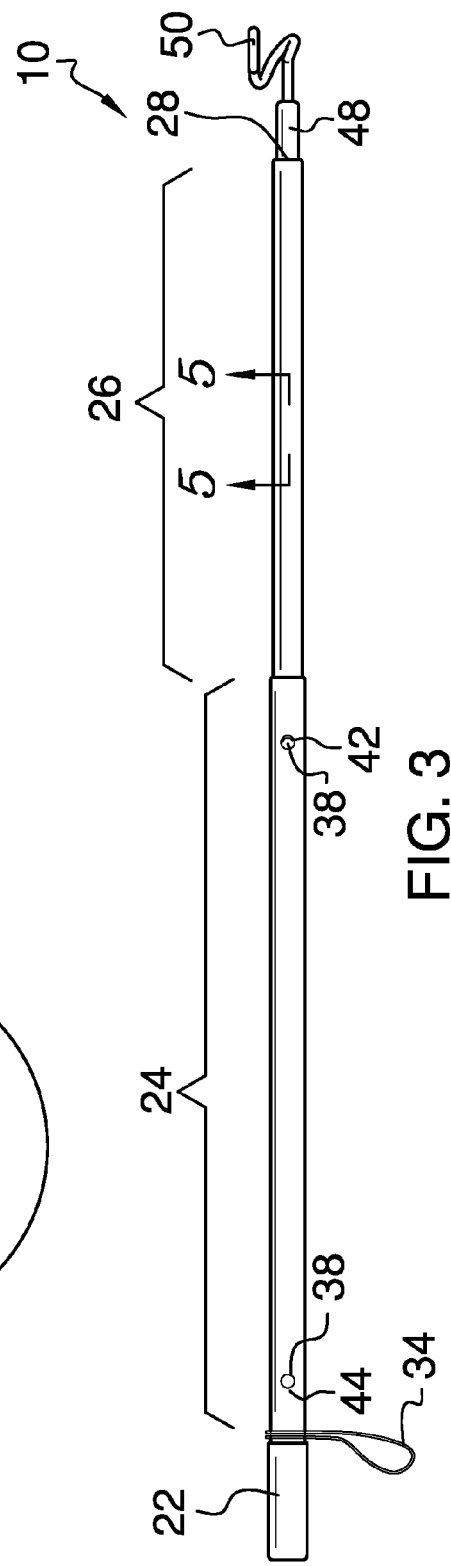

FISHING LURE RETRIEVAL APPARATUS

BACKGROUND OF THE INVENTION

Various types of fishing apparatuses are known in the prior art. However, what has been needed is a fishing lure retrieval apparatus including a telescopic cylindrical pole and a looped strap attached to the cylindrical pole. What has been further needed is a cylindrical hook attachment member attached to and extended outwards from a front end of a front portion of the cylindrical pole and an S-shaped hook member attached to a front surface of the cylindrical hook attachment member. Lastly, what has been needed is for the S-shaped hook member to be perpendicularly disposed to and extended upwards above the cylindrical hook attachment member, so that the S-shaped hook member is selectively engageable around a fishing lure. The fishing lure retrieval apparatus is thus uniquely structured to allow a user to telescopically extend a pole in order to capture and retrieve a fishing lure that is either underwater or caught in trees and limbs along a shoreline using the S-shaped hook member.

FIELD OF THE INVENTION

The present invention relates to fishing apparatuses, and more particularly, to a fishing lure retrieval apparatus.

SUMMARY OF THE INVENTION

The general purpose of the present fishing lure retrieval apparatus, described subsequently in greater detail, is to provide a fishing lure retrieval apparatus which has many novel features that result in a fishing lure retrieval apparatus which is not anticipated, rendered obvious, suggested, or even implied by prior art, either alone or in combination thereof.

To accomplish this, the present fishing lure retrieval apparatus includes a cylindrical pole having a rear handle portion, a hollow rear portion statically attached to the rear handle portion, and a front portion telescopically attached and selectively slidably disposed within the hollow rear portion. Each of the hollow rear portion and the front portion has a front end and a back end, and an entirety of an interior cavity of the front portion of the cylindrical pole is foam in order to provide the cylindrical pole with buoyancy in a body of water. A looped strap is attached to the hollow rear portion of the cylindrical pole adjacent to the rear handle portion in order to provide a user with a more secure grip on the cylindrical pole.

The fishing lure retrieval apparatus further includes a locking mechanism including a pair of holes disposed within the hollow rear portion of the cylindrical pole and a pushable pin disposed on the front portion of the cylindrical pole proximal the back end. Each of a proximal hole and a distal hole of the pair of holes is disposed within the hollow rear portion proximal the front end and the back end, respectively, so that the pushable pin selectively engages each of the proximal hole and the distal hole of the pair of holes in order to selectively lock the front portion in an extended position and an alternate retracted position.

A cylindrical hook attachment member is attached to and extended outwards from the front end of the front portion of the cylindrical pole. An S-shaped hook member is attached to a front surface of the cylindrical hook attachment member. The S-shaped hook member is perpendicularly disposed to and extended upwards above the cylindrical hook attachment member so that the S-shaped hook member is selectively engageable around a fishing lure.

Thus has been broadly outlined the more important features of the present fishing lure retrieval apparatus so that the detailed description thereof that follows may be better understood and in order that the present contribution to the art may be better appreciated.

BRIEF DESCRIPTION OF THE DRAWINGS

Figures

FIG. 2 is a top plan view.
FIG. 3 is a side elevation view.

DETAILED DESCRIPTION OF THE DRAWINGS

Figure 1:
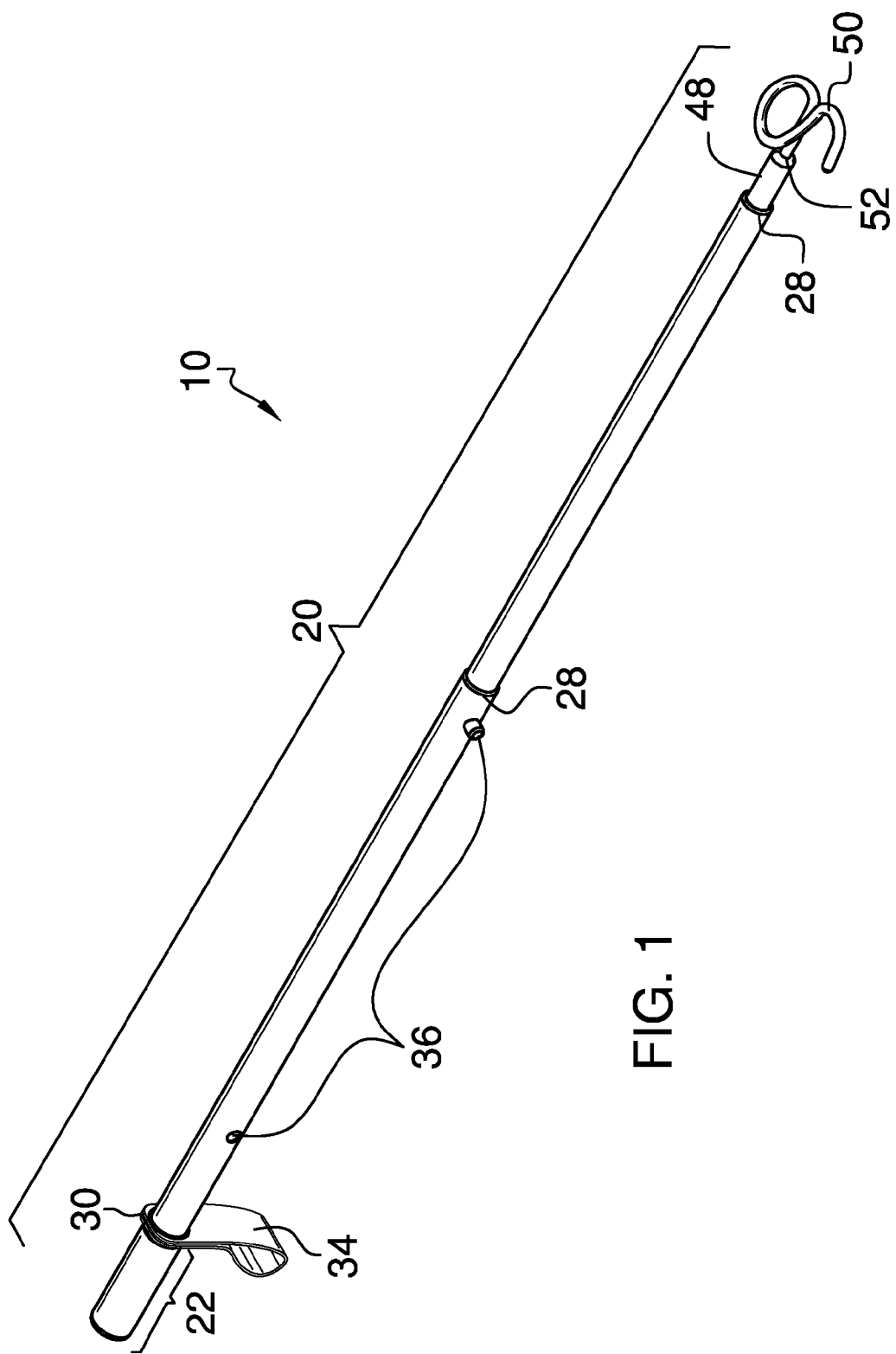
FIG. 1 is a front isometric view.
Figure 4:
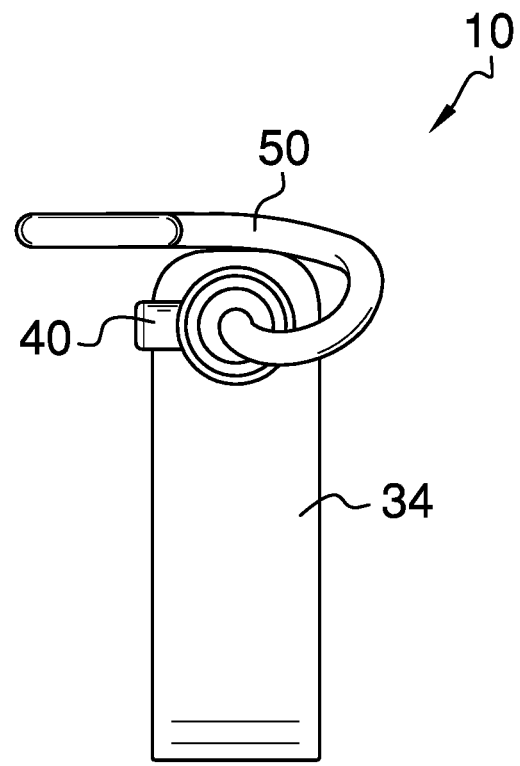
FIG. 4 is a front elevation view.
Figure 5:
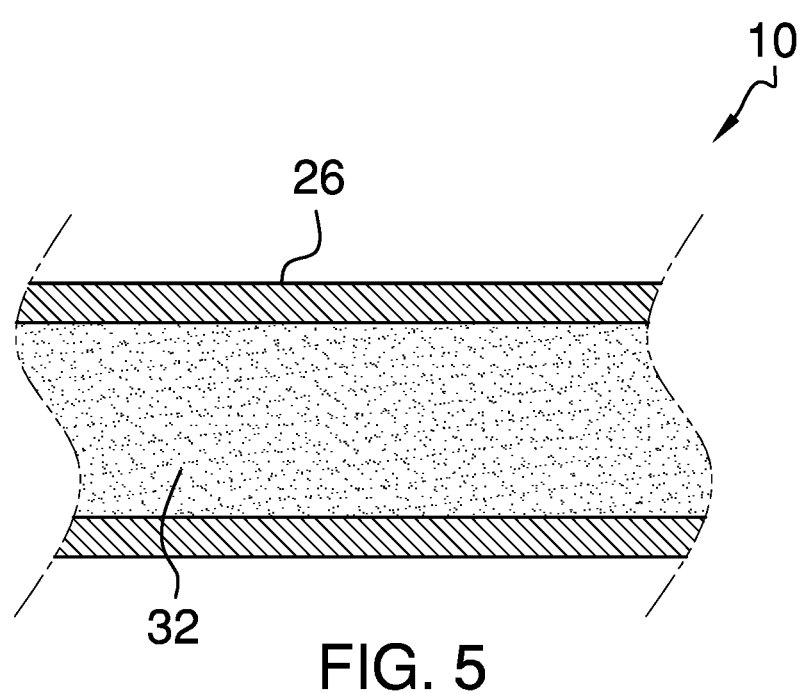
FIG. 5 is a cross-sectional view taken along line 5-5 of FIG. 3.
Figure 6:
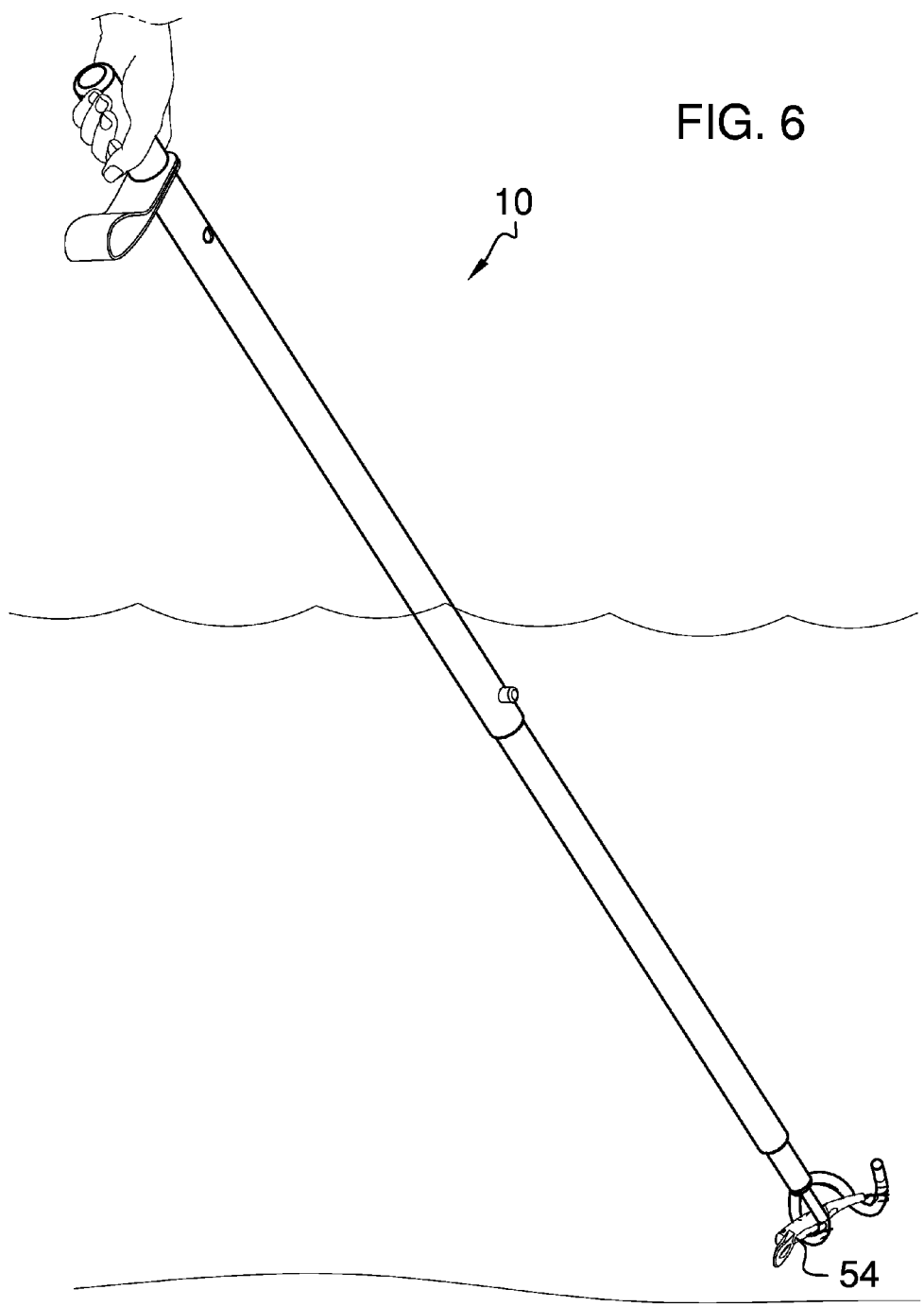
FIG. 6 is an in use view.

With reference now to the drawings, and in particular FIGS. 1 through 6 thereof, an example of the instant fishing lure retrieval apparatus employing the principles and concepts of the present fishing lure retrieval apparatus and generally designated by the reference number 10 will be described.

Referring to FIGS. 1 through 6 the present fishing lure retrieval apparatus 10 is illustrated. The fishing lure retrieval apparatus 10 includes a cylindrical pole 20 having a rear handle portion 22, a hollow rear portion 24 statically attached to the rear handle portion 22, and a front portion 26 telescopically attached and selectively slidably disposed within the hollow rear portion 24. Each of the hollow rear portion 24 and the front portion 26 has a front end 28 and a back end 30, and an entirety of an interior cavity 32 of the front portion 26 of the cylindrical pole 20 is foam. A looped strap 34 is attached to the hollow rear portion 24 of the cylindrical pole 20 adjacent to the rear handle portion 22.

The fishing lure retrieval apparatus 10 further includes a locking mechanism 36 including a pair of holes 38 disposed within the hollow rear portion 24 of the cylindrical pole 20 and a pushable pin 40 disposed on the front portion 26 of the cylindrical pole 20 proximal the back end 30. Each of a proximal hole 42 and a distal hole 44 of the pair of holes 38 is disposed within the hollow rear portion 24 proximal the front end 28 and the back end 30, respectively, so that the pushable pin 40 selectively engages each of the proximal hole 42 and the distal hole 44 of the pair of holes 38 in order to selectively lock the front portion 26 in an extended position and an alternate retracted position.

A cylindrical hook attachment member 48 is attached to and extended outwards from the front end 28 of the front portion 26 of the cylindrical pole 20. An S-shaped hook member 50 is attached to a front surface 52 of the cylindrical hook attachment member 48. The S-shaped hook member 50 is perpendicularly disposed to and extended upwards above the cylindrical hook attachment member 48, so that the S-shaped hook member 50 is selectively engageable around a fishing lure 54.

What is claimed is:
1. A fishing lure retrieval apparatus comprising:
   a cylindrical pole having a rear handle portion, a hollow rear portion statically attached to the rear handle portion, and a front portion telescopically attached and selectively slidably disposed within the hollow rear portion, each of the hollow rear portion and the front portion having a front end and a back end;

wherein an entirety of an interior cavity of the front portion of the cylindrical pole is foam;

a looped strap attached to the hollow rear portion of the cylindrical pole adjacent to the rear handle portion;

a locking mechanism comprising a pair of holes disposed within the hollow rear portion of the cylindrical pole and a pushable pin disposed on the front portion of the cylindrical pole proximal the back end, wherein each of a proximal hole and a distal hole of the pair of holes is disposed within the hollow rear portion proximal the front end and the back end, respectively, wherein the pushable pin selectively engages each of the proximal hole and the distal hole of the pair of holes in order to selectively lock the front portion in an extended position and an alternate retracted position;

a cylindrical hook attachment member attached to and extended outwards from the front end of the front portion of the cylindrical pole; and an S-shaped hook member attached to a front surface of the cylindrical hook attachment member, wherein the S-shaped hook member is perpendicularly disposed to and extended upwards above the cylindrical hook attachment member;

wherein the S-shaped hook member is selectively engageable around a fishing lure.

\* \* \* \* \*